UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

PROCESS OF TREATING WASTE SULFITE LIQUORS, &c.

1,298,476. Specification of Letters Patent. Patented Mar. 25, 1919.

No Drawing. Application filed January 9, 1914. Serial No. 811,141.

*To all whom it may concern:*

Be it known that I, VIGGO DREWSEN, a citizen of the United States, and resident of the borough of Brooklyn, county of Kings, city and State of New York, have made a certain new and useful Invention Relating to Processes of Treating Waste Sulfite Liquors, &c., of which the following is a specification.

This invention relates especially to the treatment of waste sulfite liquors, such as are produced in wood pulp paper manufacture by which the organic compounds therein may be converted by treatment with caustic alkali or the like, such as soda, lime or carbonate of soda, the mixture being preferably heated under pressure for several hours and then filtered to remove the precipitated lignin compounds, the filtrate apparently containing the converted lactonic acids and the like. This filtrate may then be concentrated and heated under pressure, if desired, with caustic soda or the like to the extent of twenty to fifty per cent. or so and then subjected to distillation with superheated steam which separates the acetone or other ketones and alcohols, etc., this distillation taking place preferably after the causticized mixture has been reduced to a substantially dry condition by evaporation or admixture of large quantities of caustic lime or the like. The distillation residue may also be burned and leached to recover the soluble alkali material therein and the precipitated lignin compounds may also be further treated for conversion into tanning material, etc.

The waste sulfite liquor from paper digesters, etc., may be neutralized with suitable caustic alkali, such as soda, lime, etc., which is preferably used in considerable excess and this action which seems to convert the organic compounds is promoted by heating and agitation. It is in many cases desirable to take the waste sulfite liquor while still hot from the digester and run it into a suitable converter or digester containing an excess of caustic alkali, such as two to six per cent. or so of caustic soda, caustic lime, etc., which is allowed to react with the liquor at high temperatures for several hours, heat being supplied so as to keep the pressure up to 80 or 100 pounds more or less per square inch while the mixture is preferably agitated as by the use of suitable stirrers in the digester, or by using a rotary digester or converter to effect this agitation. Such caustic alkali treatment seems to convert the organic compounds in the sulfite liquor, the woody material being apparently converted into lignin or similar compounds which tend to precipitate; and certain other organic components such as some of the sugars are apparently transformed into various lactonic acids or allied soluble compounds capable of being broken up or producing on dry distillation with steam under proper conditions, acetone or other ketones and alcohols, which may be used as solvents for pyroxylin or for the ordinary varnish gums and resins. The sulfurous acid previously combined with the woody material combines with the lime or other earthy alkali used for this conversion, so that it may be precipitated and recovered and used for the original digesting action on the wood or other fibrous material. It is furthermore possible since even the soluble inorganic compounds can be subsequently recovered in this process to use instead of calcium bisulfite, sodium sulfite or other normal sulfite compounds for the original digesting action on the wood, etc., and secure additional advantages in this way.

The converted mixture is preferably separated by filtration which may be more conveniently effected in some cases after carbon-dioxid gas has been percolated through the mixture preferably at considerable pressure which tends to promote the precipitation and aggregation of the particles of the lignin material. The lignin when separated by filtration from the converted mixture usually represents some 30 per cent. or so of the dry weight of the organic matter in the original sulfite liquor and this lignin material may of course be used for the manufacture of tanning material and may also be dried to form a finely divided organic compound suitable for use for many purposes, such as for an inert filler in paint, linoleum and other products.

The filtrate secured from the original sulfite digester liquor after such conversion, or the sulfite liquor waste after the production of grain alcohol from the sulfite liquor by various processes after first subjecting it to a similar high temperature conversion with caustic alkali, may be concentrated to a thick syrupy consistency as by evaporation in suitable multiple effect evaporators and then may be subjected to a further caustic alkali conversion by heating it with a large proportion of caustic soda or the like at ordinary, or preferably high pressures which seems to effect a further conversion or splitting up of the organic compounds, possibly into simpler lactonic acids or allied compounds. Caustic soda to the extent of 10 to 50 per cent. or so of the concentrated solution may be used for this alkali converting action and the causticized mixture may then be submitted to distillation with superheated steam or the like in any desired way either by feeding the causticized mixture into a suitable retort with or without a preliminary drying out or evaporation of the mixture. Or if desired the causticized mixture may be made substantially dry or non-fluent by the incorporation of powdered unslaked lime therewith sufficient to combine with the water present and drive off considerable quantities of the water by the heat of slaking so as to convert the causticized material into a dry powder, if desired, when about an equal weight of the quicklime has been used. It is of course understood that where a considerable excess of soda, etc., is originally incorporated with the waste sulfite liquor beyond that necessary to neutralize its acid components, this excess of soluble soda or the like would be present with the filtrate containing the material subsequently concentrated and transformed for the dry distillation treatment so that in some cases it would be unnecessary to incorporate additional amounts of soda, etc., to effect this conversion in the manner described.

On distillation of the converted or causticized soluble material with superheated steam, for example, at 300 to 500 degrees C. or so acetone and other ketones and alcohols are produced to the extent of some 7 or 8 per cent. of the dry weight of the organic matter in the original sulfite liquor and several per cent. more of heavier oily distillate is also secured besides considerable proportions of other more volatile material, some of which is of a gaseous nature and which is sufficiently inflammable so as to be used for retort heating and other heating purposes if desired. The products of distillation may be separated or fractionated in any suitable way to separate the more valuable volatile solvent from the other material which includes several per cent. of a black oily material substantially immiscible with water and of rather lighter specific gravity. A repeated distillation may be resorted to in a column still for example, or such an apparatus may be used to separate the original products of distillation.

The distillation residue in the retort may be submitted to still higher heat and may be finally burned in the presence of air and the caustic or other valuable mineral matter may be separated as by leaching with hot water, for example, which takes up the caustic present and permits it to be recovered in the form of caustic or carbonate of soda for reuse and the remaining insoluble material may, if desired, be burned in a suitable kiln to recover the lime.

This invention has been described in connection with a number of illustrative materials, proportions, arrangements and orders of steps, to the details of which disclosure the invention is not of course to be limited, since what is claimed as new and what is desired to be secured by Letters Patent is set forth in the appended claims:

1. The process of treating waste sulfite liquors which consists in incorporating therewith an excess of caustic alkali material and simultaneously agitating the mixture while heated for several hours under about 100 pounds pressure, thereby precipitating the lignin compounds which are produced in filtering off the liquid containing converted lactonic acids and related components in solution, in concentrating such filtrate and heating the same under pressure with 20 to 50 per cent. of caustic soda, in drying and subjecting the causticized mixture to distillation with superheated steam at about 300 to 500 degrees centigrade to produce acetone or other ketones and alcohols and additional volatile material, in burning the distillation residue and recovering by leaching the soluble mineral matter therefrom.

2. The process of treating waste sulfite liquors which consists in incorporating therewith an excess of caustic alkali material and simultaneously agitating the mixture while heated for several hours under pressure, in percolating carbon-dioxid through the material and precipitating the lignin compounds thus produced and filtering off the liquid containing converted lactonic acids and related components in solution, in concentrating such filtrate and heating the same under pressure with 20 to 50 per cent. of caustic soda and in subjecting the causticized mixture to distillation with steam at about 300 to 500 degrees centrigrade to produce acetone or other ketones and alcohols and additional volatile material.

3. The process of treating waste sulfite liquors which consists in incorporating therewith caustic alkali material and simultaneously agitating the mixture while heated for several hours under pressure, in precipitating the lignin compounds thus produced and separating the liquid containing converted lactonic acids or related components in solution, in concentrating such liquid and heating the same with a large proportion of caustic soda, and in subjecting the causticized mixture to distillation with steam to produce acetone or other ketones and alcohols and additional volatile material.

4. The process of treating waste sulfite liquors which consists in incorporating therewith an excess of caustic soda and simultaneously heating and agitating the mixture for several hours under about 100 pounds pressure, in percolating carbon-dioxid through the material and precipitating the lignin compounds thus produced and filtering off the liquid containing converted material in solution, in concentrating such filtrate and heating the same with 20 to 50 per cent. of alkali caustic and in drying and subjecting the converted material to distillation with superheated steam at about 300 to 500 degrees centigrade to produce acetone or other ketones and additional volatile material.

5. The process of treating waste sulfite liquors which consists in incorporating therewith an excess of caustic soda and simultaneously heating the mixture for several hours under pressure, in precipitating the lignin compounds thus produced and filtering off the liquid containing lactonic acids or other converted material in solution, in concentrating such filtrate and heating the same with caustic alkali and in drying and subjecting the converted material to distillation with steam at about 300 to 500 degrees centigrade to produce acetone or other ketones and additional volatile material.

6. The process of treating waste sulfite liquors which consists in incorporating therewith an excess of caustic soda and simultaneously heating the mixture for several hours under pressure, in precipitating the lignin compounds thus produced and separating the liquid containing lactonic acids or other converted material in solution, and in drying and subjecting the converted material to distillation with steam to produce acetone or other ketones and additional, volatile material.

7. The process of treating waste sulfite liquor which consists in incorporating therewith an excess of caustic soda and heating the same until sugary components of the waste liquor are converted into lactonic acids or other converted organic material in solution and in drying and subjecting the converted material to distillation at about 300 to 500 degrees centigrade to produce acetone or other ketone or alcohol.

8. The process of treating waste sulfite liquor material which consists in treating the material with an excess of caustic soda and heating the same until conversion producing lactonic or similar converted soluble material takes place and in distilling the converted material with steam to produce acetone or other ketone or alcohol.

9. The process of treating waste sulfite liquor material which consists in heating the same in the presence of caustic soda until conversion takes place and in distilling the converted material at about 300 to 500 degrees centigrade to produce acetone or other ketone or alcohol.

VIGGO DREWSEN.

Witnesses:
 HARRY L. DUNCAN,
 JESSIE B. KAY.